United States Patent [19]

Belbel et al.

[11] Patent Number: 4,816,958

[45] Date of Patent: Mar. 28, 1989

[54] FAULT CURRENT INTERRUPTER INCLUDING A METAL OXIDE VARISTOR

[75] Inventors: Elie Belbel, Epinay sur Seine; Louis Fechant, Le Vesinet; André Vergez, Villennes sur Seine; Jean P. Riotte, Epinay sur Seine, all of France

[73] Assignee: La Telemecanique Electrique, France

[21] Appl. No.: 119,592

[22] Filed: Nov. 12, 1987

[30] Foreign Application Priority Data

Nov. 14, 1986 [FR] France ............................... 86 15827

[51] Int. Cl.[4] .......................... H02H 3/08; H01H 9/42

[52] U.S. Cl. .......................................... 361/93; 361/11; 361/13

[58] Field of Search ...................................... 361/2-13, 361/58, 93, 103, 106, 91; 338/22 R

[56] References Cited

U.S. PATENT DOCUMENTS

| | | | |
|---|---|---|---|
| 3,241,026 | 3/1966 | Andrich | 361/106 X |
| 3,249,810 | 5/1966 | Strom et al. | 361/3 |
| 3,673,538 | 6/1972 | Faxon | 361/106 X |
| 3,916,264 | 10/1975 | Berg | 361/106 |
| 4,307,428 | 12/1981 | Yanabu et al. | 361/3 X |
| 4,413,301 | 11/1983 | Middleman et al. | 361/58 X |
| 4,475,012 | 10/1984 | Coulmance | 361/91 X |
| 4,583,146 | 4/1986 | Howell | 361/13 |
| 4,631,621 | 12/1986 | Howell | 361/13 |
| 4,700,256 | 10/1987 | Howell | 361/8 X |

*Primary Examiner*—M. H. Paschall
*Assistant Examiner*—A. Jonathan Wysocki
*Attorney, Agent, or Firm*—William A. Drucker

[57] ABSTRACT

An electric protection apparatus is provided for protection against current faults of different intensities, including, in series in an internal circuit, a first switch with automatic opening, which is controlled by moderate current levels, and a second switch with automatic opening having short circuit current limiting properties; a zinc oxide voltage limiting component, which is placed in parallel across this latter, has a fairly low stabilization threshold so that diverted currents, flowing through it at the time of opening on a short circuit, extend as far as the resistive portion of the characteristic which follows the stabilization level portion.

13 Claims, 8 Drawing Sheets

FAULT CURRENT INTERRUPTER INCLUDING A METAL OXIDE VARISTOR

FIELD OF THE INVENTION

The invention relates to an electric protection apparatus for automatically interrupting fault currents reaching different levels, in which an internal circuit placed between an input terminal connected to the grid and an output terminal going to a load includes:

1. a mechanical switching device which is opened when the circuit has current flowing therethrough reaching a first level;
2. a current limiting device which reacts more rapidly than the preceding one when the growth rate of the current results from the existence of a short circuit by reaching a second higher level, and which develops a potential difference very rapidly at its terminals, this limiter then being the cause of an initial release of power;
3. static voltage stabilizing means which are connected in parallel across this limiting device for transferring therethrough a fraction of the currents when this potential difference reaches a value equal to the stabilization voltage of the static means.

DESCRIPTION OF THE PRIOR ART

Such switching devices are, for example, known from the U.S. Pat. No. 3 249 810, in which a resistor with high temperature coefficient and a non linear voltage limiting resistor are placed in parallel across a first mechanical current limiting switch; in this known device, when this first switch is opened, current which would have flowed through the switch is transferred through the first resistor and there is a protection effect of this first resistor which is developed by the voltage limiting resistor. The presence of a second switch whose opening is slightly retarded with respect to that of the first one, then makes possible complete isolation of the circuit.

As is clear from the text of this document, the threshold voltage of the voltage limiting resistor is adapted to the appearance of voltages which may reach two to three times the normal peak voltage of the grid and its role, which is theoretically reduced to that of a means for protecting the resistor with positive temperature coefficient, necessarily means that this threshold voltage is relatively high; it appears therefore that the effects of the prior circuit, which result in a reduction of the stresses to which such a switch would have been exposed in this device, only come into play when these stresses already reach high values.

Since, moreover, one of the roles which this latter stabilizing resistor provides is oriented towards limiting the heat energy released in the first resistor, it is certain that the currents which flow through it at no time deviate from the working range having a stable voltage threshold, beyond which operation of a conventional resistive type appears.

SUMMARY OF THE INVENTION

The present invention provides improvements to a switching device, whose construction makes it possible to divert a fraction of the currents at the time of opening of the contacts as in the prior device, for causing the current transfer phenomenon to come into action more rapidly, so as to reduce the dimensions of the arc cases and the manifestations which develop therein, while observing that some known materials having voltage limiting properties may without damage tolerate a short deviation from their operating point in a branch with resistive character which was avoided in the prior art.

These improvements are in particular advantageous for apparatus in which the powers involved are of the order of a few KJ and in which the limited currents are of the order of a few KA.

In accordance with the invention, this aim is reached because the voltage stabilizing means include a zinc oxide component, having the following properties:

a. the threshold voltage is less than or equal to the voltage which appears at the terminals of the limiting device when a current flows between the input and output terminals corresponding to the appearance in the limiting device of a release of energy having a predetermined reduced value.
b. a first stabilizing characteristic branch of this component of an extent such that the initial transferred currents are close to and less than a current defining in this characteristic the presence of a bend from which extends a second resistive characteristic branch, this latter having a slope such that the flow of subsequent transferred currents, which are greater than the first diverted currents, develops at the terminals of this component a voltage rapidly reaching the instantaneous voltage of the grid.

Voltage stabilizing resistors using in particular zinc oxide may at the present time tolerate without fail overloads whose energy may in a short interval of time reach an order of size of 500 $J/cm^3$, so that their incorporation in a molded case for a protection switching device is not accompanied by an increase in size which would further reduce the benefits of reducing the volume of the arc chambers.

Furthermore, resistors with high positive temperature coefficient, comprising polymers charged with appropriate conducting elements, may at present tolerate peaks of a few KW for a short interval of time.

Generally, it should be considered that any energy in whatever form which is dissipated, either instantaneously, at the time that a .short circuit current appears, or stored then restored after the passage thereof, contributes to limiting this current.

Consequently, the behavior of switching means, respectively current limiters, may be dealt with coherently within the scope of a general energy balance taking into account the energy developed, whether this latter is instantaneously transformed into a current phenomenon of mechanical or thermal nature or, on the contrary, whether it is so to speak stored in heat form then subsequently rediffused in a more moderate way. We will see further on that all these phenomena will have to be accompanied, at one moment or another, by a rapid development of a voltage capable of opposing that of the grid.

BRIEF DESCRIPTION OF THE DRAWINGS

The invention, as well as constructional variants to which this may give rise, will be better understood from reading the following description with reference to the accompanying FIGS. which show.

DESCRIPTION OF THE PREFERRED EMBODIMENTS

Figure 1:
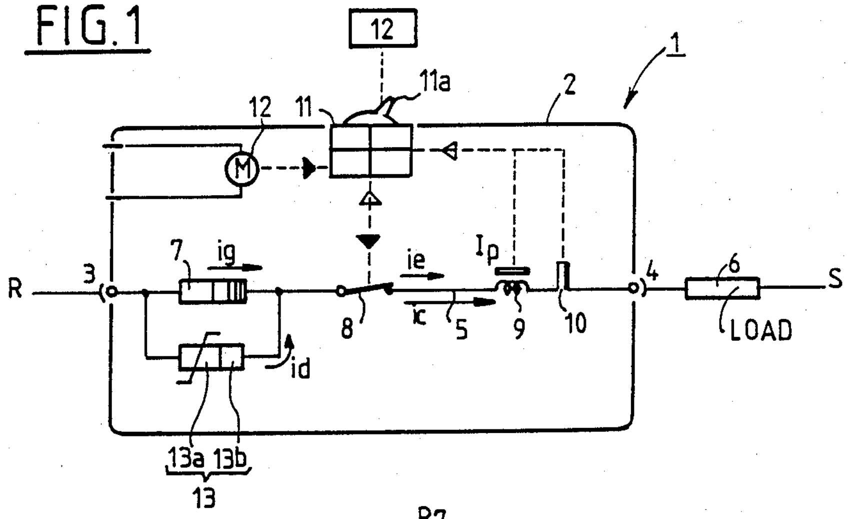
In FIG. 1, a general diagram of a first embodiment of the invention, in which the first current limiting device is formed by a special resistor.

A protection apparatus 1 for protecting against current faults likely to appear in a line and, as the case may be, in a series load, is illustrated in FIG. 1, where 2 represents an isolating case with at least, between two connection terminals 3, 4 of a phase, an internal circuit 5 which is placed in series with an external load 6 and which is fed through a supply network R,S.

Circuit 5 includes, in series, a static current limiting device 7, a mechanical isolating cut-out switch 8, a detector of instantaneous current overloads 9 of a magnetic type, and a thermal detector of moderate, but extended, overloads 10; detector 9 reacts to a first current level or threshold -IP-.

These two detection devices which cause tripping of a mechanism 11, previously set by a manual means $11_a$ or by a remote control means such as a motor 12, serve essentially for protecting load 6, whereas the static limiting device 7 is dimensioned so as to react to the appearance of short circuit currents, whose growth must be limited so as to protect in particular the supply lines.

Figure 2:
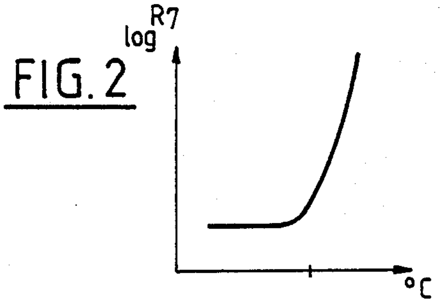
In FIG. 2 diagram of the evolution of the resistance of an organic based conducting compound of the conducting polymer type.

In parallel, across the current limiting device 7 which is here formed by a resistor having a very high positive temperature coefficient comprising for example conducting polymers, there is provided a static voltage limiting device 13 whose basic material includes zinc oxide. The nature of these members 7 and 13, as well as their dimensions, have been chosen so that, on the one hand, the growth of the short circuit currents develops very rapidly in the first one a high temperature which causes its resistance -$R_7$- to increase very rapidly when an increase in current -$i_g$- flows; the curve shown in FIG. 2 gives an idea of the trend of this evolution.

Figure 3A:
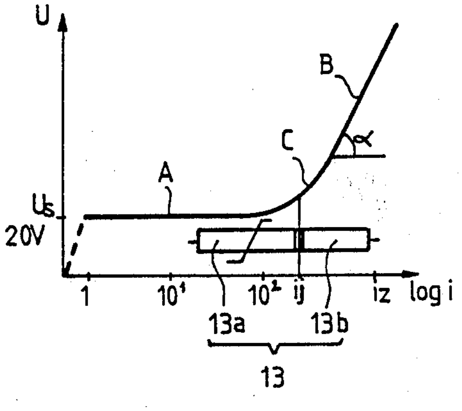
In FIGS. 3a and 3b, diagrams of the evolution of the voltage appearing at the terminals of the zinc oxide voltage limitation resistors, when they have increasing currents flowing therethrough.
Figure 3B:
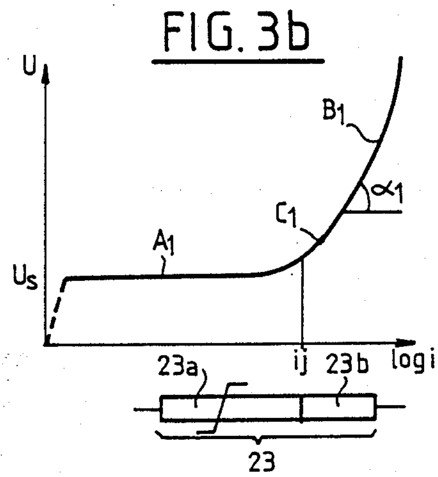

On the other hand, the static voltage limiting member 13 is chosen so that its stabilization threshold -$U_s$-, shown in FIG. 3a, has a sufficiently low value for increasing transfer currents -$i_d$- to flow therethrough before a release of heat energy which is too high or destructive of its properties is developed by Joule effect in the current limiting resistance 7 when this latter has flowing therethrough an initial short circuit current -$i_g$- reaching a certain value, in other words, high diverted currents -$i_d$- begin to flow through the voltage stabilizing components 13 as soon as a potential difference appears at the terminals of resistor 7 greater than this threshold voltage.

The current transfer which thus occurs in this voltage limiting member when the current deviation -$i_d$- occurs in the horizontal branch -A- of the curve shown in FIG. 3a, may in accordance with the invention reach proportions of about two orders of magnitude before rising branch -B- is concerned having a resistive character with a very pronounced slope $\alpha$, which follows a bend -C- in the characteristic occurring for a current -$i_j$-; the choice of the values -$U_s$-, -$i_j$-, and -$\alpha$- results from the desired sharing of the energy between resistor 7 and component 13 so that they keep their properties without any risk of damage.

The evolution of the behaviors of these members must be such that branch -B- has effectively flowing therethrough high but non destructive currents, and for a short period of time during which a sort of paralleling of two resistors occurs; this operating mode is shown in the corresponding FIGS. 1 and 3a by the fact that the voltage stabilizing member 13 is here shown by the series combination of two associated elements 13a, 13b each complying with the characteristics of the corresponding branch -A- respectively -B-. The evolution of the currents in the two branches is shown in FIG. 4.

Figure 4:
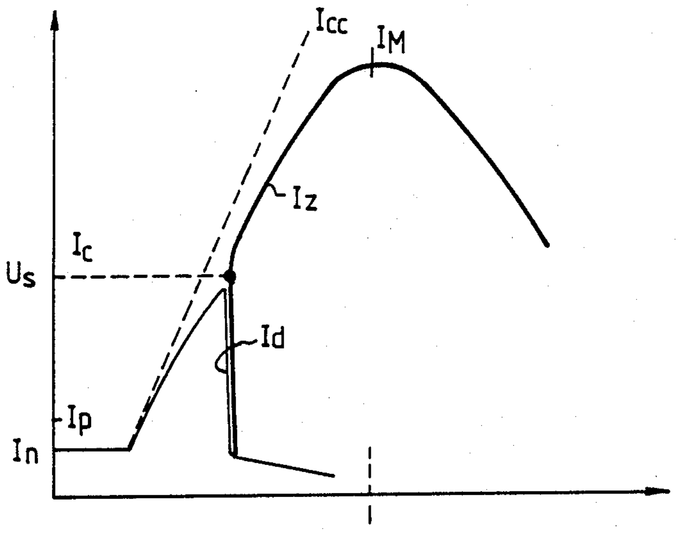
In FIG. 4, a diagram of the evolution of the currents flowing through the circuit of FIG. 1 at the time of appearance of short circuits.
Figure 7A:
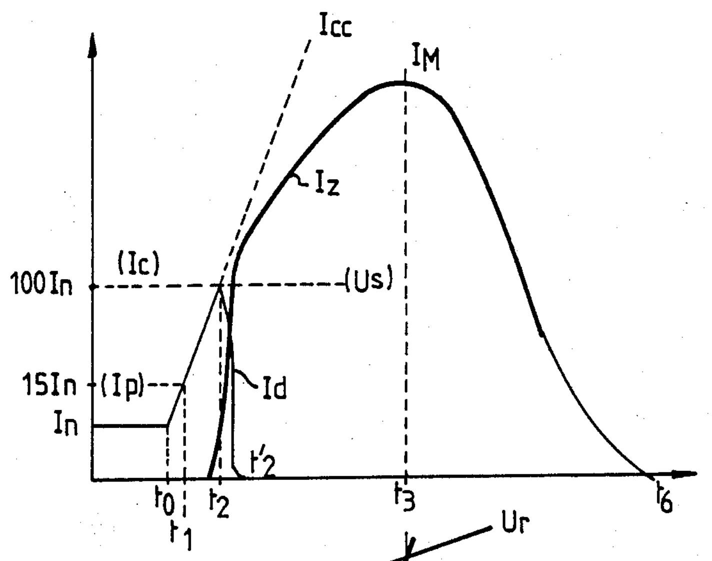
In FIGS. 7a, 7b, two diagrams of the evolution of the currents and voltages appearing in a device such as the one shown in FIG. 5, at the time of appearance of short circuits.
Figure 7B:
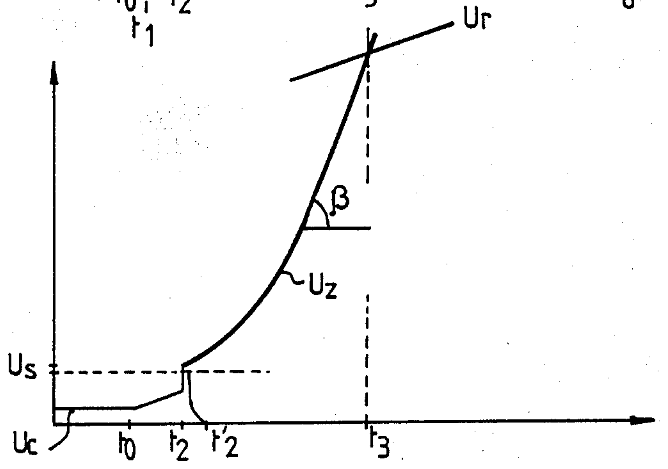

At the end of the short period of time required for the two phenomenon to develop in an interconnected way, the magnetic current detector 9 in its turn reacts for releasing the mechanical energy accumulated in member 11; this energy is in its turn used for causing opening of switch 8 which is only required to break a considerably reduced current -$i_e$- and establish complete isolation of the circuit, see FIGS. 4 and 7a. If the fault currents do not reach the level of those of a short circuit, only switch 8 provides a circuit breaking function.

Figure 5:
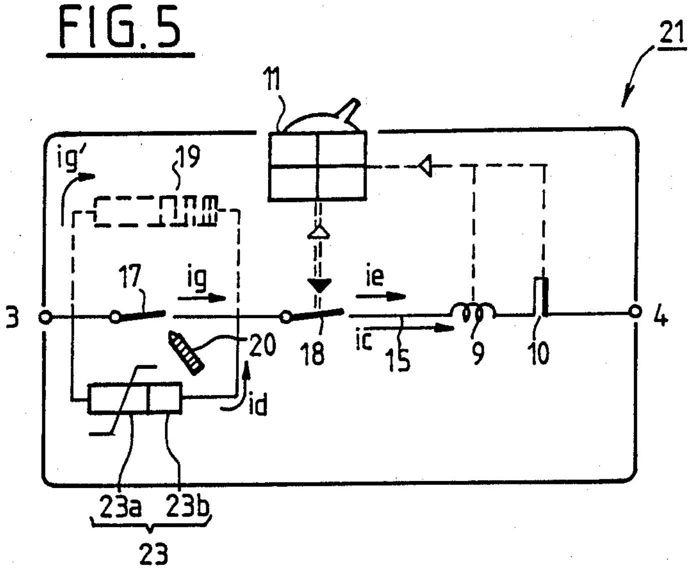
In FIG. 5, a general diagram of a second embodiment in which the current limiting device is formed by a first mechanical switch.

In a variant 21 of the circuit shown in FIG. 5, in which the parts having the same functions as those in FIG. 1 are accompanied by references identical to those in this Figure, a second mechanical switch 17 here provides the short circuit current limiting element function. Such a switch may use the electro-dynamic repulsion forces which become efficient for very high currents.

At the time of opening of such a switch, the evolution of the arc voltage -$U_a$- appearing at its terminals with respect to the voltage of the grid, governs the growth of the current -$i_e$- in circuit 15; it is known that the evolution of this arc voltage whose growth must be as rapid as possible, is in particular determined by the elongation speed of the arc (possibly broken up on fins) and/or by the rate of reduction of its section (possibly forced by a restriction), as well as by the cooling rate. Each of these arrangements or combinations thereof, as well as the use of a double cut-off contact bridge may be chosen for developing a rapid growth of the arc voltage using, as required, appropriate means such for example as an isolating screen 20 passing rapidly between the contacts.

As in the preceding embodiment shown in FIG. 1, a static voltage limiting member 23, which may be likened to the series connection of a pure limiting member 23$_a$ with a voltage threshold -$U_s$- extending as far as a bend -C- for a current -$i_j$- and a resistive member 23$_b$ with slope -α- in its characteristic part -B-, is placed in parallel across the mechanical switch 17, see also FIG. *3b*.

When a short circuit appears in circuit 15, see FIGS. *7a* and *7b*, a current starting from nominal intensity -$I_n$- and having a growth of direction $I_{cc}$ begins to form at time $t_0$; at time $t_1$, this current reaches a value -$I_p$- at which the current detectors such as 8 would react if this growth were less rapid. This value -$I_p$- is, for example, of the order of size of twelve to fifteen times the nominal current -$I_n$- when it is desired for example to protect a motor representing the load.

The effective opening of the limiting switch 17 takes place when the current flowing therethrough reaches a value -$i_c$- which is of the order of 50 to 100 times that of the nominal current, at time $t_2$.

In conventional limiting switches used for low voltage, in which the arc voltage of a mechanical switch is caused to develop rapidly, this arc voltage starts from an initial value of the order of 15 to 20 V to reach maximum values for example of 800 V so that a limited current peak -$i_M$- is rapidly established. This phenomen which is governed by the equation:

$$L(di/dt)+Ri=U_r-U_a$$

in which L and R are the inductance and resistance of the circuit, and where $U_r$ and $U_a$ represent the voltages of the grid and respectively the arc voltage, shows that the limited current peak -$i_M$- is practically reached when $U_a=U_r$.

In the circuit 15 shown in FIG. 5, a limiting resistance 23 has for example been chosen having a voltage threshold -$U_s$- of the order of 20 V, which extends along a characteristic part -A- where the current -$i_j$- of the bend -C- is close to the value of the current -$i_c$-.

Consequently, as soon as -$U_a$- reaches 20 V, there is a very rapid transfer of the current which flowed through switch 17 to the stabilizing component 23 which behaves in practice like a very low resistance shunt through which a diverted current -$i_d$- flows; failing a sufficient voltage -$U_c$- at its terminals the arc is then extinguished in the region of time $t_2$ at $t'_2$.

It is however necessary, if it is desired to establish statically a limiting operating mode comparable to that which would occur in the presence of an arc, to substitute for an increasing arc voltage, another increase in voltage, as happens for circuit 5 in FIG. 1.

This increasing in voltage -$U_z$- is obtained here, because a region -$B_1$- of the characteristic curve of component 23 has, after the bend -$C_1$-, a rising branch of resistive trend with slope -$\alpha_1$- allowing the passage of a subsequent current -$i_z$- which is accompanied by the development at its terminals of an increasing voltage -$U_z$- of slope -$\beta_1$-, see FIG. *3b*.

The higher this slope, the sooner a time $t_3$ will be reached at which $U_r=U_z$ and the current -$i_z$- reaches a peak value equal to -$i_M$-, see FIGS. *7a* and *7b*.

It can be seen from these FIGS. that the major part of the energy released by this cut-off has been consumed and stored in the $Z_nO$, component 23, whereas switch 17 has been the seat of only an extremely limited development of energy in the form of an arc of very short duration.

The external thermal, mechanical and sound manifestations, as well as erosion of the contacts of the switch are consequently considerably limited.

It is therefore advantageous to use a $Z_nO$ component which has simultaneously at -$A_1$- a voltage threshold -$U_{s1}$- of low value, a resistive characteristic slope -$\alpha_1$- of high value or rapidly increasing at -$B_1$- and a stabilizing range of an extent which is compatible both with the maximum current which it is desired to transfer for extinguishing the arc at the time when it has released a predetermined and low amount of energy and with the maximum energy which the $Z_nO$ component may absorb without damage so that reversibility of its operation is ensured for a number of operating cycles fixed beforehand.

One of the ways in which a $Z_nO$ voltage limiting component can better support a given thermal shock or a thermal shock developed beforehand consists in forming it by associating two elements in parallel having similar properties.

Although, under these conditions, the extent of the stabilizing range may be reduced so that each of these components has a less intense current passing therethrough, for example -$i_{d/2}$-, those among them having higher slopes -α- must on the other hand be chosen so that the increase of the voltage -$U_z$- at the terminals keeps substantially the same trend.

Figure 17:
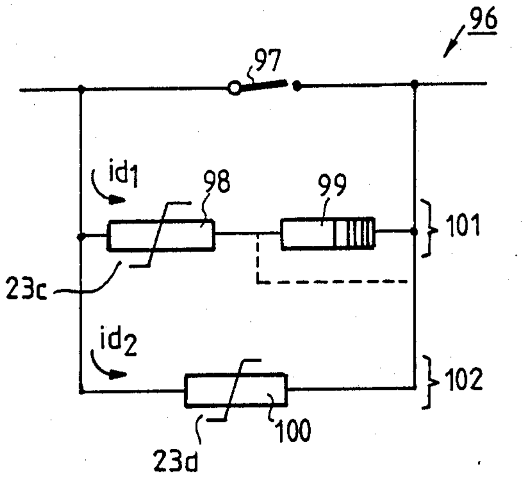
In FIG. 17, a first special circuit having two stabilizing component with different properties.
Figure 18:
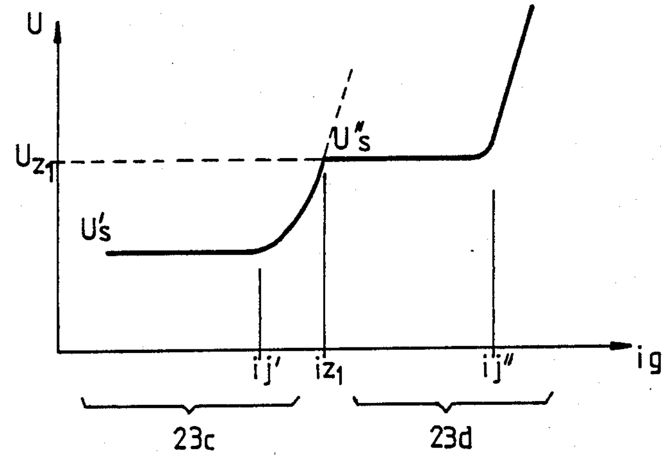
In FIGS. 18 and 19, two curves describing operating modes using parallel circuits of stabilizing components; and In FIG. 21, a diagram representing the evolution of the rapid decrease of the current after automatic cut-out following the appearance of a short circuit.

The second way of dividing the energy released in several associated $Z_nO$ voltage limiting components, consists in connecting two of them 23$_c$, 23$_d$ having substantially different stabilization thresholds -$U'_s$-, -$U''_s$- in parallel; in this case, when a current -$i_{z1}$-reached, developing at the terminals of the first component 23$_c$ a voltage -$U_{z1}$- equal to the highest threshold voltage -$U''_s$- of the second component, there is a second transfer of current, so that the first component no longer undergoes as high an energy development, see FIGS. 17 and 18.

It is clear that the reality of this second current transfer can only be established if the current with bend -$i''_j$- of the component 23$_d$ is greater than the current with bend -$i'_j$- of component 23$_c$.

Furthermore, the value of the growth slope of the voltage, resulting from the parallel connection of two branches of type -B- with distinct resistive characteristics, leads to a reduction of the growth slope -β- of the voltage to be expected, which, after this second transfer, will follow a corresponding overall trend of smaller slope; this disadvantage may be overcome by choosing a component whose bend current -$i''_f$- is high.

Figure 19:
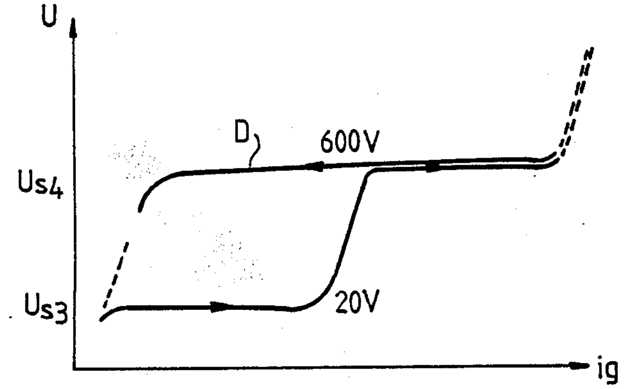

A current transfer device may also be formed using, in parallel, components with different voltage thresholds -$U_{s3}$- -$U_{s4}$-, so that the operating characteristic has a hysteresis property, and so that, after reaching its peak value, the current decreases, on the return path through a voltage threshold -$U_{s4}$- which is very much greater than the voltage threshold -$U_{s3}$-, concerned on the outward path, see FIG. 19.

The use of such a device which makes it possible to give to or to keep for the current decrease slope -γ- a considerable value, results in reducing the total cut-off time -$t_6$-.

Figure 20:
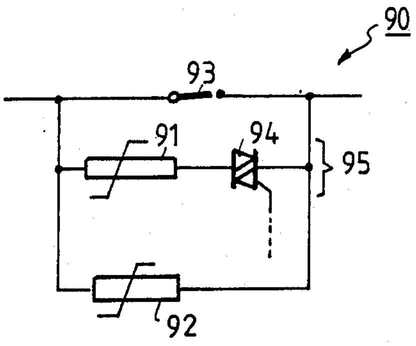
In FIG. 20, a second special circuit having two stabilizing components with different properties.

In a first circuit 90 shown in FIG. 20, in which two very different $Z_nO$ threshold voltage components 91, 92 (for example 20 V for one and 600 V for the other) are placed in parallel across a limiting switch 93, a controlled semiconductor 94 may be used in the first branch 95 receiving the first component 91 whose threshold voltage is lower.

In the particular circuit 96 shown in FIG. 17, there are placed in parallel across the mechanical limiting switch 97:

- on the one hand, a first zinc oxide voltage limiting component 98; having a voltage threshold -$U_{s3}$- of a value close to 20 V, which is connected in series with a resistor 99 having a very high temperature coefficient and including conducting polymers,
- on the other hand, a second zinc oxide voltage limiting component 100, having a high value voltage threshold -$U_{s4}$- for example close to 600 V when the voltage of the grid is of the order of 380 V to 440 V.

At the time when the limiting switch 97 opens and when the current transfer -$i_{d1}$- occurs in the first branch 101, there is as before extinction of the arc and a very high energy release in resistor 99; this phenomenon may take on several aspects depending on whether the rapid increase of resistance takes place substantially at the time when the current reaches the value -$I_f$- of the bend -C-, see the continuous line curve, or subsequently for a current -$i_{f1}$-, see the broken line curve.

In both cases, the resistive growth slope is modified with respect to the slope which a single threshold component would have.

As soon as the voltage at the terminals of the first branch 101 reaches a value equal to the voltage threshold -$U_4$- of the second component 100, a current -$i_{d2}$- is transferred into the second branch 102.

Figure 21:
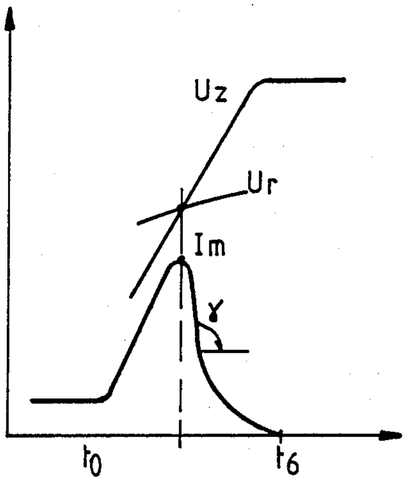

The presence of the positive temperature coefficient resistor, which is again at a high temperature and consequently has a very high resistance, means that the current cannot flow through branch 101 by following the characteristic of component 98. The voltage at the terminals is then brought under control by the presence alone of the second component 100, which amounts to saying that during decrease of the current, this decrease occurs by observing the conditions of branch -D- along which the operating point moves, see FIG. 21 which illustrates the operation of the device shown in FIG 17. The equation:

$$L(di/dt)+Ri=U_r-U_s$$

has then a right hand side $U_r$- $U_{s4}$- which remains very much less than zero, so that (di/dt) follows a comparable evolution; the result is a very rapid decrease of the current which contributes to reducing the total cut-off time -$t_6$- and results consequently in a reduction of the energy released between times -$t_0$- and -$t_6$-.

An additional improvement in the decrease of energy released by the arc in the circuit of FIG. 5 may be obtained by placing in parallel across the limiting switch 17 a resistor with a high temperature coefficient 19 shown with broken lines and comparable to that used before with reference 7, see FIG. 5.

The role of this resistor, which is here not identical to that which it played in the previous example shown in FIG. 1, is to make possible, on the one hand, the immediate appearance of an additional diverted current -$i_g$- before the voltage threshold -$U_s$- of the stabilizing resistor 23 is reached, while causing, on the other hand, a considerable consumption of energy before the rising branch of the characteristic resistive portion of the voltage limiting resistor is reached, which will in its turn have the current -$i_z$- flowing therethrough.

The trend of the double current transfer phenomenon shows that, although the limited current only undergoes a modest reduction of its peak value, the energy released instantaneously by the arc (expressed for example by $\int i^2dt$) is reduced in interesting proportions.

As in the preceding example, subsequent opening of the mechanical switch 18 which now only breaks a substantially limited current, makes possible total isolation of the circuit.

However, with a single 20 V $Z_nO$ threshold component, the time -$t_4$- when this last opening occurs must precede time -$t_s$- at which a reestablishment voltage -$U_m$- appears at the terminals of the apparatus higher than the threshold voltage.

The energy which was stored in heat form in resistor 19 and component 23 is dissipated subsequently in one or more regions 24, 25 of case 22, which are designed so as to allow rapid evacuation thereof, see FIG. 6.

Figure 6:
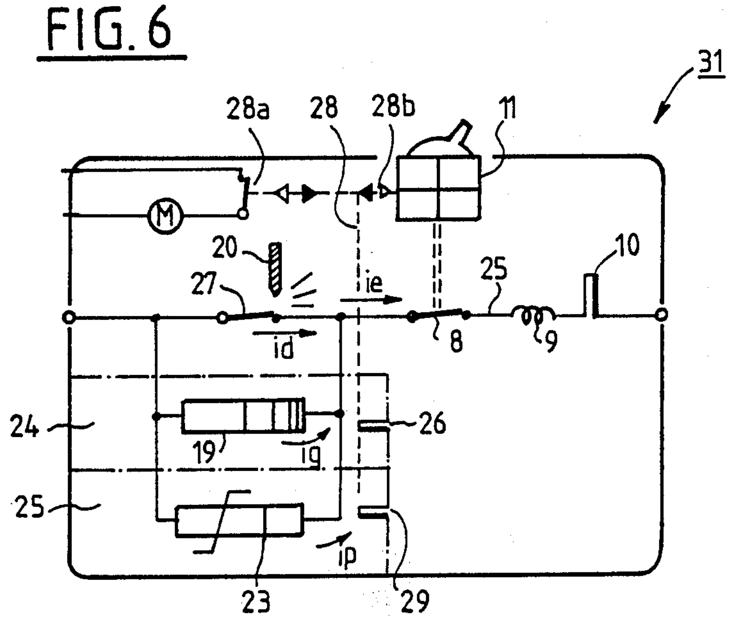
In FIG. 6, an improvement applicable to one of the devices of the circuits of FIGS. 1, 8 or 9.
Figure 14:
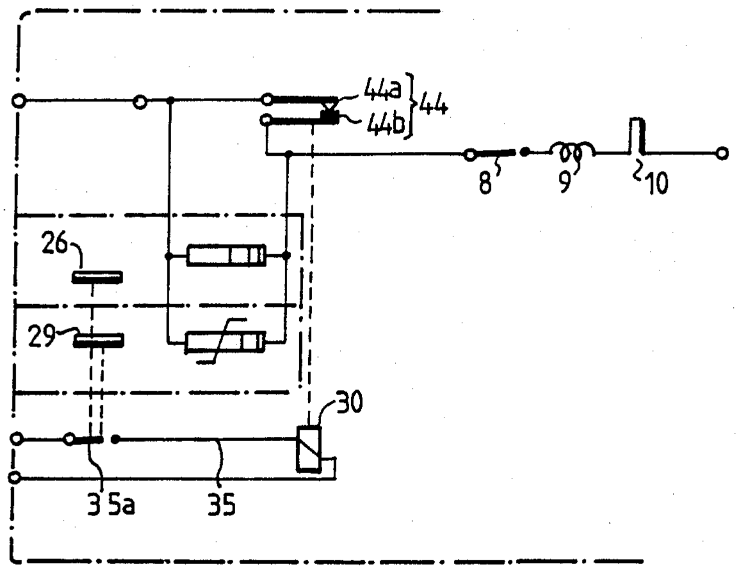
In FIG. 14, a part of a fault current switching circuit, in which the monitoring means, which are associated with thermally loaded components, provide protection against being brought back again into service too quickly.

In an improved apparatus 31 shown in FIG. 6, temperature detectors, for example bimetallic strips such as 26, 29, may be associated with these regions for making impossible by mechanical means 28, 28$_b$ or respectively electric means 28, 28*a* manual or remote controlled resetting of mechanism 11, as long as the stabilizing resistor and/or component have not yet found a given thermal balance; in the embodiment of FIG. 14, wherein the same reference numerals denote the same components as in FIG. 6, these temperature detectors will prevent, then allow voluntary reclosing of the switch after automatic opening, for example by acting on the supply circuit 35 of a remote controlled electromagnet 30 by means of the series switch 35$_a$; a switch 44 having a mobile limiting contact 44$_a$ and a pseudo-fixed contact 44$_b$ actuated by the electromagnet 30 will allow this type of operation.

In the case of such remote control, occurring in the absence of a fault, an additional means must be provided for switching out resistors 19, 23 so that isolation of the line is total, when this maneuver is effected with a closed switch 8.

Figure 8:
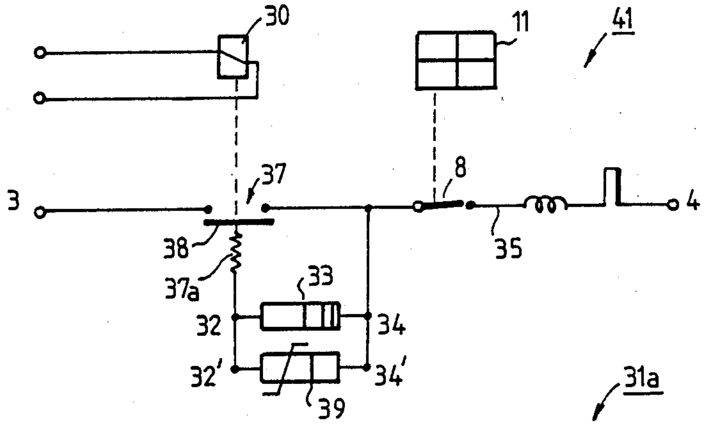
In FIG. 8, one embodiment of a protection device in which the current limitation is provided by means of a contact bridge which may further be actuated by a remote controlled electromagnet.

In the case where the limiting switch 37 of an apparatus 41 is of the contact bridge type 38, this latter may for example be connected by means of a conducting braid 37*a* to terminals 32, 32' of the resistors 33 respectively 39, whose other terminals 34, 34' are connected directly either to the supply terminal 3 of circuit 35 or to switch 8, see FIG. 8. In such a circuit, this switch 8 may if required be omitted by causing the mechanism 11 to act on switch 37 concurrently with the action of the remote control electromagnet 30.

Figure 9:
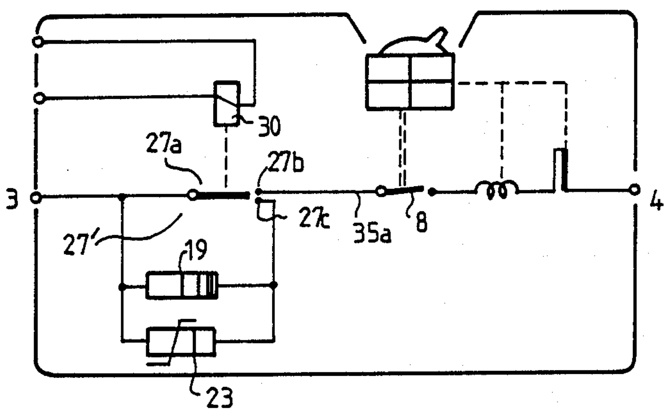
In FIG. 9, one embodiment of a protection device in which a limiting contact of special construction is associated with a remote controlled electromagnet.

In the embodiment $31_a$ illustrated in FIG. 9, the limiting switch 27', whose opening may be remote controlled by the electromagnet 30, has a mobile contact $27_a$ which is applied in the closed position to two fixed isolated contacts $27_b$, $27_c$ one of which is connected to switch 8 whereas the other is connected to the two resistors 23, 19, so that opening of this mobile contact establishes total isolation of circuit $35_a$.

Figure 10:
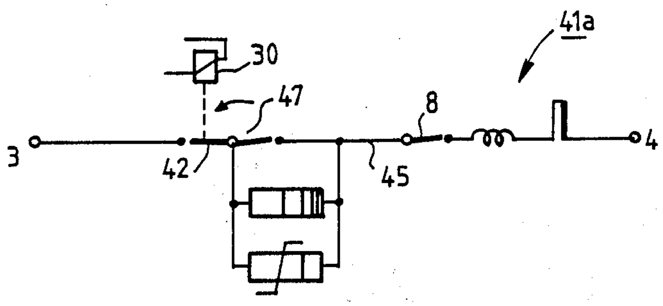
In FIG. 10, a device having two associated switches offering another possibility of obtaining isolation of the circuit.

If the limiting switch 47 of an apparatus $41_a$ is of the single cut-off type by means of a mobile contact, an additional switch 42 must be provided whose movement will be associated or not with that of the limiting switch, see FIG. 10, for removing the two resistors from circuit 45 and obtaining total isolation.

Figure 16:
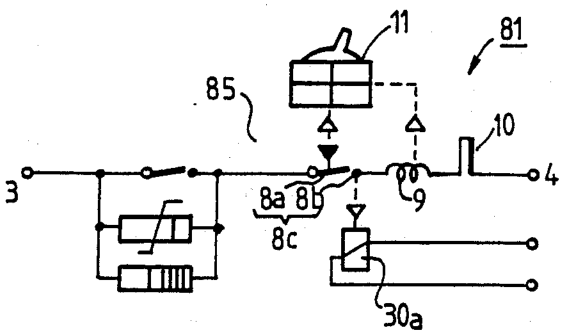
In FIG. 16, a variant of the remote controlled opening means which are applied here to an isolating switch.

It is also possible to obtain remote controlled opening of a circuit 85 belonging to an apparatus 81 shown in FIG. 16, by causing a remote control electromagnet 30 to act on one of the mobile $8_a$ or fixed $8_b$ contacts of a switch $8_c$ associated appropriately with the mechanism 11 for providing either trip out functions or isolating functions.

Figure 11:
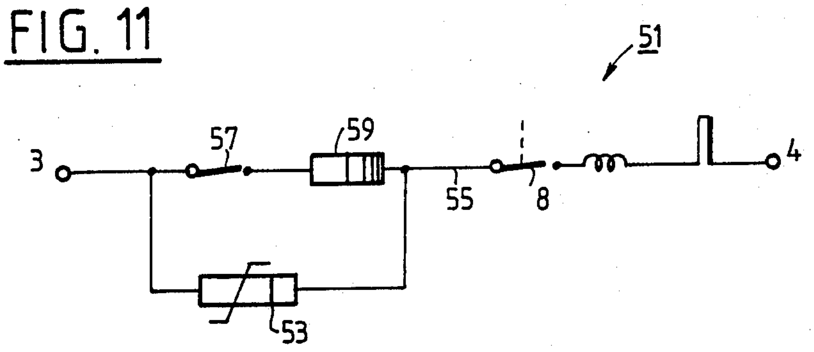
In FIGS. 11, 12, 13, second, third and fourth organizations of the switching means used in FIG. 5.

In a first variant 51, shown in FIG. 11, in which a combination of measures taken from FIGS. 1 and 5 has been used, the stabilizing resistor 53 is connected in parallel across the series connection of a mechanical limiting switch 57 and a resistor 59 with high positive temperature coefficient; here again, complete isolation of circuit 55 can only be obtained by the subsequent opening of switch 8.

Figure 12:
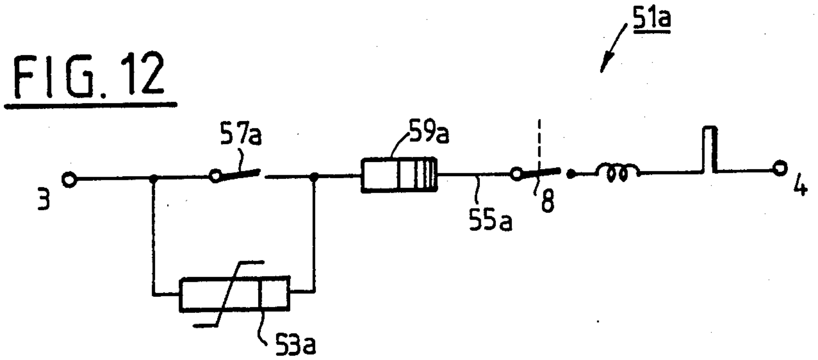

In a second variant $51_a$, shown in FIG. 12, in which a combination comparable to the preceding one has been used, the stabilizing resistor $53_a$ is connected in parallel with a limiting switch $57_a$ and this parallel circuit is in its turn placed in series with the resistor $59_a$ with high positive temperature coefficient in circuit $55_a$.

Figure 13:
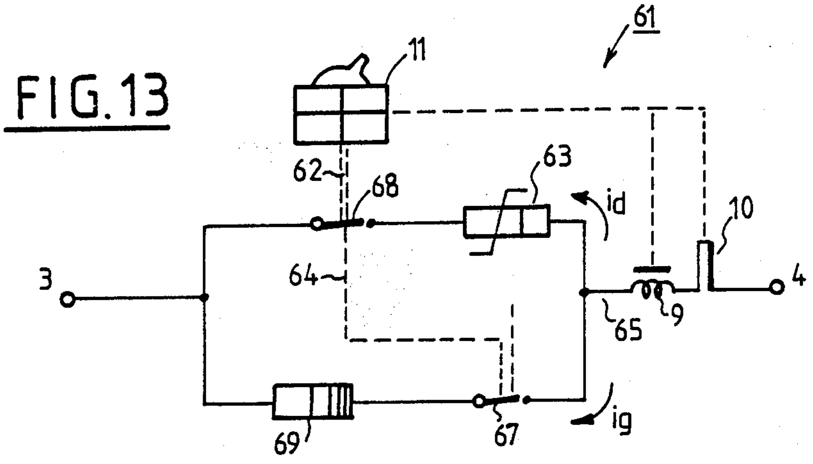

Finally, in an embodiment 61, shown in FIG. 13, a limiting switch 67 is placed in series with a high positive temperature coefficient resistor 69, this series circuit being itself placed in parallel in circuit 65 with a series circuit including an isolating switch 68 and a voltage limiting resistor 63.

In a first operating phase under short circuit current conditions, this protection device operates like that shown in FIG. 11, because of the previous opening of the limiting switch 67 which must first of all interrupt a current -$i_g$-; the deviated current -$i_d$- which simultaneously caused a high rise of the resistance of element 63 is then cut off by opening the isolating switch 68 when a magnetic coil 9 causes tripping of mechanism 11.

This type of circuit obviously requires a certain mechanical pairing 62, 64 of the action of mechanism 11 on the two switches 68, 57 so as to establish total isolation when the current faults are only detected by coil 9 or the bimetal strip 10.

Figure 15:
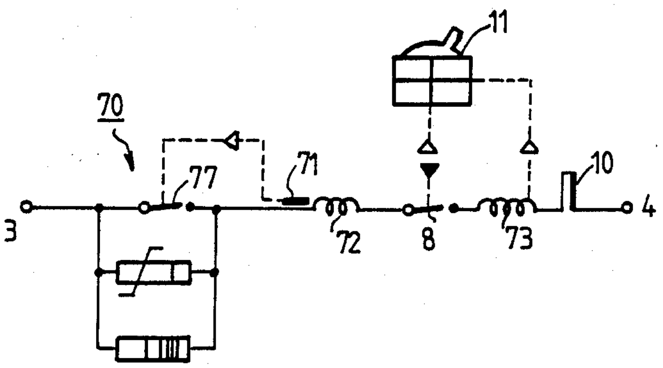
In FIG. 15, a diagram of the circuits protecting against fault currents in which the limiting switch is of a special type.

Among the possibilities which are offered for constructing limiting switch apparatus 17, 27, 37, 47, 57, 67 whose nominal rating is lower, that 70 illustrated in FIG. 15 may be mentioned, where the mobile contact 77 with single or double cut-off, is subjected to percussion communicated when short circuit currents appear, for example by the instantaneous movement of a plunger core 71 which is associated with a second high speed magnetic coil 72 placed in series with a first coil 73 whose slower function is comparable to that of coil 9 of FIG. 1

Finally, it is possible to associate, with the mobile contacts of the isolating switches, magnetizable structures in the form of a U which are known and which are capable of communicating to these contacts electrodynamic forces for reinforcing, on the one hand, the contact pressure in the closure direction when high currents attributable to short circuits flow and capable on the other hand, in relieving this contact pressure at the time when, with the intensity of these short circuit currents having substantially decreased, movement of the mobile contact must be provided in the opening direction.

What is claimed is:

1. A fault current interrupter comprising mechanical switching means and current limiter means serially connected in an electric circuit between a source of electric power supply and a load, and switch actuating means for opening said mechanical switching means to interrupt the circuit when a predetermined time interval has elapsed after occurrence of a fault current, said current limiter means comprising the parallel combination of:

i. first current sensitive means exhibiting a resistance value which is negligible with respect to that of the load when a rated current flows into the circuit and, in the occurrence of a short circuit, a resistance value which rapidly increases during said predetermined interval, and of ii. second voltage and current sensitive means having a clamping threshold voltage whereby substantially no current flow therethrough when the voltage across its terminal is lower than said clamping threshold voltage, while, when an increasing current flows therethrough, the voltage drop across its terminal substantially keeps the said clamping threshold voltage value until the said increasing current reaches a predetermined intensity and when said increasing current exceeds said predetermined intensity, the voltage drop across said terminals rapidly increase substantially above said clamping threshold voltage value, wherein the said clamping threshold voltage is so predetermined at a value substantially lower than the supply voltage that, when a current transfer takes place in the occurrence of a short circuit during said predetermined time interval from said first current sensitive means to said second voltage and current sensitive means at the time when the voltage drop across said first current sensitive means reaches said thereshold, the current flowing through the second voltage and current sensitive means will increase until it exceeds said predetermined intensity, whereby the voltage drop across the terminal of the second voltage and current sensitive means will rapidly and substantially exceed said clamping threshold voltage during said predetermined time interval.

2. The fault current interruper of claim 1, wherein said first current sensitive means is a positive temperature coefficient resistor.

3. The fault current interrupter of claim 1, wherein said first current sensitive means comprises a mechanical circuit breaker switch, the threshold voltage of the second voltage and current sensitive means substantially equals the arc voltage drop across said circuit breaker switch at the time of occurrence of a short circuit.

4. The fault current interrupter of claim 1, wherein, while said source of electric power supply is the grid system, said first current sensitive means comprises a mechanical circuit breaker switch and the threshold voltage of the second current sensitive means is comprised between 20 and 30 v.

5. The fault current interrupter of claim 3, wherein a positive coefficient temperature resistor is further in parallel connected across in the first and second means.

6. The fault current interrupter of claim 3, wherein said first current sensitive means further comprises a positive temperature coefficient resistor connected in series with said mechanical circuit breaker switch.

7. The fault current interrupter of claim 3, wherein a positive temperature coefficient resistor is further connected in series with said current limiter means and said mechanical switching means.

8. A fault current interrupter comprising mechanical switching means and current limiter means connected in an electric circuit between a source of electric power supply and a load, and switch actuating means for opening said mechanical switching means to interrupt the circuit when a predetermined time interval has elapsed after occurrence of a fault current, said current limiter means comprising:

i. first current sensitive means exhibiting a resistance value which is negligible with respect to that of the load when a rated current flows into the circuit and, in the occurrence of a shorter circuit, a resistance value which rapidly increases during said predetermined interval, and of ii. second voltage and current sensitive means having a clamping threshold voltage whereby substantially no current flows therethrough when the voltage across its terminal is lower than said clamping threshold voltage, while, when an increasing current flows therethrough, the voltage drop across its terminal substantially keeps the said clamping threshold voltage value until the said increasing current reaches a predetermined intensity and when said increasing current exceeds said predetermined intensity, the voltage drop across said terminals rapidly increases substantially above said clamping threshold voltage value, wherein the said clamping threshold voltage is so predetermined at a value substantially lower than the supply voltage than, when a current transfer takes place in the occurrence of a short circuit during said predetermined time interval from said first current sensitive means to said second voltage and current sensitive means at the time when the voltage drop across said first current sensitive means reaches said threshold, the current flowing through the second voltage and current sensitive means will increase until it exceeds said predetermined intensity, whereby the voltage drop across the terminal of the second voltage and current sensitive means will rapidly and substantially exceed said clamping threshold voltage during said predetermined time interval, said second means being connected in series with said mechanical switching means to form a series combination and said first means being connected in parallel across said series combination and comprising a positive temperature coefficient resistor connected in series with a mechanical circuit breaker switch.

9. The fault current interrupter of claim 2, wherein thermal detector means are thermally coupled to said positive temperature coefficient resistor and to said second voltage and current sensitive means and control means, responsive to said thermal detector means, prevent closure of said mechanical switching means, after said predetermined time interval as long as said detector means have not reached thermal equilibrium.

10. The fault current interrupter of claim 3, wherein said second means comprise first and second parallel connected voltage and current sensitive components respectively having first and second threshold voltages, the threshold voltage of the first being substantially lower than that of the second component.

11. The fault current interrupter of claim 3, wherein said second means comprise a first voltage and current sensitive component connected in parallel across the series combination of a second voltage and current sensitive component and of blocking means for preventing the current flow through said series combination, said second component having a threshold voltage substantially lower than that of said first component and said blocking means preventing said current flow only once the voltage across said second means has first reached the first threshold voltage and had started to decrease.

12. The fault current interrupter of claim 11, wherein said blocking means comprise a positive temperature coefficient resistor.

13. The fault current interrupter of claim 11, wherein said blocking means comprise a semi-conductor controlled rectifier.

* * * * *